United States Patent
Wytovicz

(10) Patent No.: US 11,129,496 B2
(45) Date of Patent: Sep. 28, 2021

(54) GRILL GRATE CLEANER AND OILER

(71) Applicant: Christopher Wytovicz, Lake Forest Park, WA (US)

(72) Inventor: Christopher Wytovicz, Lake Forest Park, WA (US)

(*) Notice: Subject to any disclaimer, the term of this patent is extended or adjusted under 35 U.S.C. 154(b) by 191 days.

(21) Appl. No.: 16/527,207

(22) Filed: Jul. 31, 2019

(65) Prior Publication Data

US 2020/0037819 A1 Feb. 6, 2020

Related U.S. Application Data

(60) Provisional application No. 62/712,646, filed on Jul. 31, 2018.

(51) Int. Cl.

| | | |
|---|---|---|
| *A47J 37/07* | (2006.01) | |
| *A47L 17/00* | (2006.01) | |
| *A47J 43/28* | (2006.01) | |
| *A47L 13/12* | (2006.01) | |
| *A47L 13/08* | (2006.01) | |
| *A47L 17/06* | (2006.01) | |
| *B08B 1/00* | (2006.01) | |

(52) U.S. Cl.
CPC ......... *A47J 37/0786* (2013.01); *A47J 43/288* (2013.01); *A47L 13/08* (2013.01); *A47L 13/12* (2013.01); *A47L 17/00* (2013.01); *A47L 17/06* (2013.01); *B08B 1/005* (2013.01)

(58) Field of Classification Search
CPC ..... A47J 37/0786; A47J 43/288; A47L 17/00; A47L 17/06; A47L 17/04; A47L 13/34; A47L 13/08; A47L 13/03; A47L 13/12; A47L 17/08

USPC .......... 15/105, 118, 236.01, 236.07–236.09, 15/236.1, 230.11
See application file for complete search history.

(56) References Cited

U.S. PATENT DOCUMENTS

| | | | | |
|---|---|---|---|---|
| 2,990,564 A * | 7/1961 | Sweeney | ................. | A47J 37/06 401/23 |
| 6,916,382 B1 * | 7/2005 | Aldredge | ............ | A47J 37/0786 118/264 |
| 7,861,357 B1 * | 1/2011 | Porter | ..................... | A47L 13/34 15/111 |

(Continued)

FOREIGN PATENT DOCUMENTS

| | | | | |
|---|---|---|---|---|
| DE | 9215222 U1 * | 12/1992 | ............. | A47L 17/00 |
| EP | 2868246 A1 * | 5/2015 | .......... | A47J 37/0786 |

OTHER PUBLICATIONS

Computer generated English translation of DE 9215222 U1, Gaßner, published Dec. 1992. (Year: 1992).*

*Primary Examiner* — Laura C Guidotti
(74) *Attorney, Agent, or Firm* — Wooshik Shim; Bold IP, PLLC

(57) ABSTRACT

A device for cleaning and oiling grill grates including a roller fashioned from an absorbent material rotatably mounted to a head plate, which in turn is mounted to a handle. The roller is used to apply cleaning or seasoning oil to grill grates. The plate includes a scraping element for scouring grill grates and an aperture through which a user may apply oil to the roller. The absorbent material may alternatively be mounted as a rectangular pad rather than a roller. A bottle opener attached to the handle of the device allows for the device to be conveniently hung and stored in a downward position.

17 Claims, 4 Drawing Sheets

(56) References Cited

U.S. PATENT DOCUMENTS

| | | | |
|---|---|---|---|
| 8,961,054 B2 * | 2/2015 | Gilbert | A47J 37/0786 |
| | | | 401/219 |
| 9,943,885 B1 * | 4/2018 | Rosenberger | A47L 13/34 |
| 2006/0207042 A1 * | 9/2006 | Di Paolo | A46B 7/04 |
| | | | 15/111 |

* cited by examiner

GRILL GRATE CLEANER AND OILER

This application claims the benefit of U.S. Provisional Application No. 62/712,646 filed Jul. 31, 2018.

TECHNICAL FIELD

The technical field generally relates to grill grate cleaning devices and, more particularly, to outdoor grill grate surfaces typically found in gas, charcoal, or wood fired grills.

BACKGROUND

Traditionally, grill cleaning devices have a wire brush surface made from metal, such as bronze or steel, a scraper, and in some instances, a cleaning pad to scour and clean grill grates. The metal brush surfaces are commonly characterized by a multiplicity of wire bristles. When worn, these bristles may break off and separate from the brush head and remain on or near the grill grate surfaces. Such separated bristles pose a health and safety risk as food prepared on the grill grates may stick to the separated bristles whereby the bristles accidentally and unsafely may later be consumed by a person.

Cleaning or seasoning oil may also be applied to the grill surface before grilling or during the grill surface cleaning process. Seasoning a grill is the process of heating and oiling the grates to keep your grill operating at its prime. Oil protects the grates from rust and makes them easier to clean. Examples of grill seasoning oil include, but are not limited to, high heat cooking oils, such as canola oil or peanut oil.

Previous examples of devices to apply seasoning oil often contain a storage reservoir by which a user would fill the reservoir with seasoning oil. The reservoir may be positioned above a brush surface on a grill cleaning device such that the seasoning oil could be dispensed onto the brush surface or grill surface via an aperture in the reservoir controllable by a user. As grill cleaning devices are commonly stored outdoors in proximity to an outdoor grill, seasoning oil left in the reservoir can be prone to spoiling. If a user desired to clean the reservoir, such user would be faced with the problem of accessing the interior of the reservoir.

A grill cleaning device including a brush surface typically is configured such that the brush surface was permanently joined to a handle of the grill cleaning device. When the brush surface is sufficiently worn, a user would be required to dispose of the entire grill cleaning device and replace the grill cleaning device with a new model. Usually, the bristles of the brush surface are not replaceable independent of replacing the entire grill cleaning device.

Given the issues associated with grill cleaning devices, such as breaking wire bristles and the need to replace a worn brush, along with issues associated with grill oil cleaners and reservoirs, there remains a need in the art for an improved grill cleaning and oiling device. The present invention addresses this need.

SUMMARY

The presently disclosed grill grate cleaning and oiling device is designed to apply oil to grill grates by dripping oil onto an absorbent material, through which in turn the oil is directly applied to grill grates.

In a preferred embodiment, the grill grate cleaner and oiler includes a handle, a head joined to one end of the handle, and a roller rotatably attached to the head. The head is formed from a foundational plate that has a scraper and an aperture. Oil is applied through the aperture to an exterior surface of an absorbent material on the roller. The absorbent material on the roller is fire resistant to grill heat and flames.

Preferably, the device includes a loop or bottle opener joined to a second end of the handle, opposite of the end to which the head is attached.

The absorbent material of the roller is preferably formed from synthetic fibers, hemp, burlap, cotton, other natural fibers, or a combination thereof. The roller is formed as solid continuous material or layers that are wrapped or wound around each other. The roller may be formed from the material itself or have a tube or core around which the material is applied or wound.

The aperture is preferably an elongated, narrow opening having a length that extends across the foundational plate and is positioned above the horizontal center of the roller. In addition, the aperture is positioned through the foundational plate in a channel configuration that has a wider opening at the top and a narrower opening on the bottom to funnel oil applied to the top through the channel to drip onto the roller by gravity.

In an alternative embodiment, the absorbent material is formed of a pad that attaches to the foundational plate of the head of the device. The pad is preferably rectangular shaped and is formed of an absorbent material similar to that described above for the roller.

The presently disclosed grill grate cleaning and oiling device is further described in the attached drawings and detailed description below.

DETAILED DESCRIPTION

Figure 1:
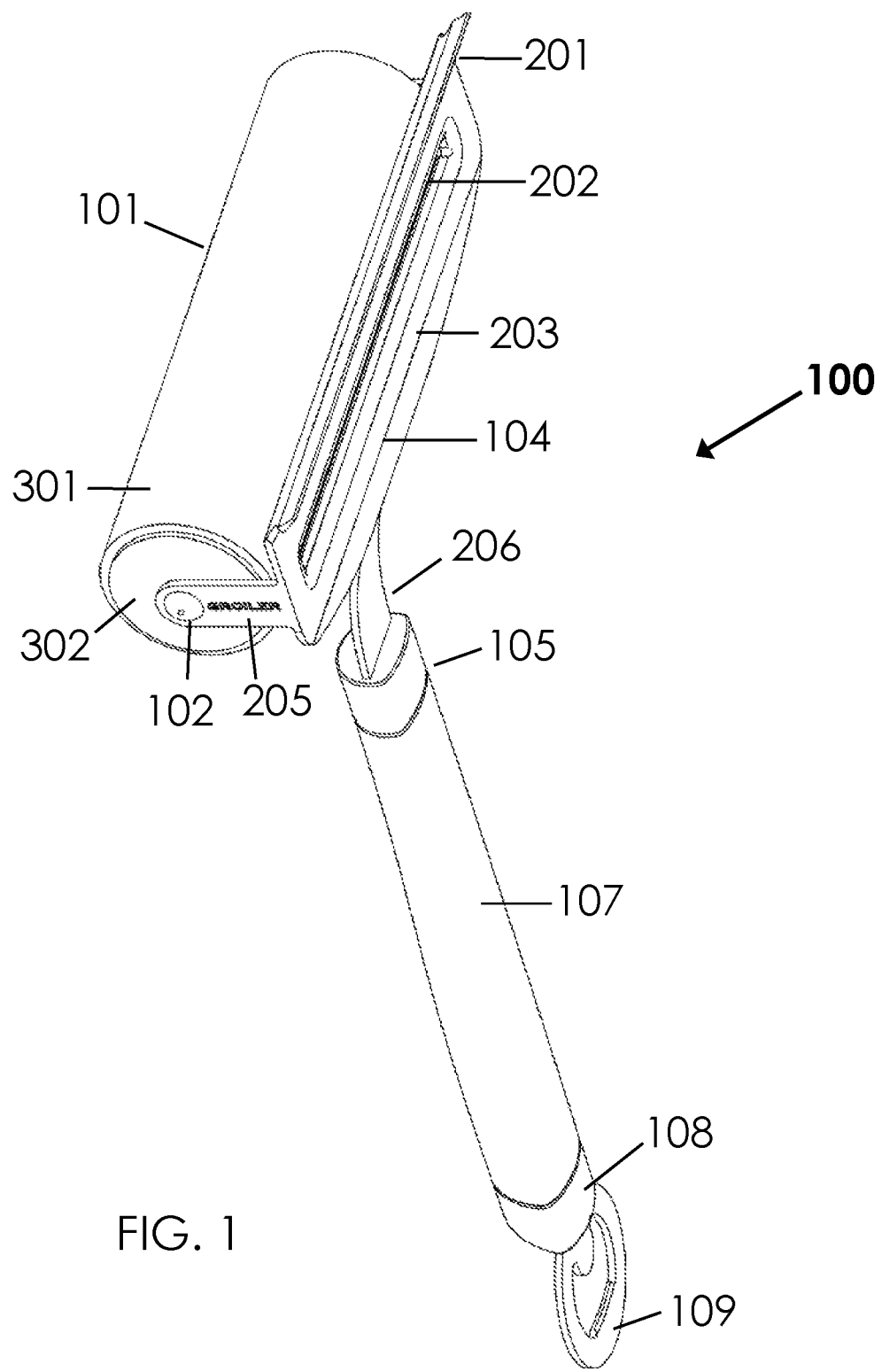
FIG. 1 is a perspective view of an embodiment of the grill cleaner and oiler with a roller.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises," and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

The following description provides preferred exemplary embodiments only, and is not intended to limit the scope, applicability, or configuration of the invention. The following description of the preferred exemplary embodiment will provide those skilled in the art with an enabling description for implementing a preferred exemplary embodiment of the invention. It being understood that various changes may be made in the function and arrangement of elements without departing from the scope of the invention as set forth in the claims.

The presently disclosed device enables a user to clean and oil/season the surface of grill grates. A rigid handle forms the basis of a gripping surface for a user to grasp and maneuver the device. The handle may be fashioned from a sufficiently rigid material, which may include but is not limited to, wood, a polymer, or a metal. Attached to the rear of the handle is a bottle opener fashioned with a closed loop from which the device may be hung on a peg or other protrusion of a structure. The bottle opener may be fashioned from a sufficiently rigid material, such as metal, a composite, and so on. Attached to the front of the handle is a head foundational plate including a combination of a roller mount, scraper, and oiling/seasoning aperture.

As used herein, the terms "oiling" and "seasoning" are analogous and may be used interchangeably. The terms refer to the process of applying a high heat cooking oil, such as but not limited to, canola oil and peanut oil, to grill grates. The oil is applied to clean the grill grates, season them to minimize food sticking to the grates and protect them from rust. Accordingly, the device described herein may be used to oil/season grill grates.

The head foundational plate may be fashioned from a sufficiently rigid material, such as metal, a composite, and so forth. The head foundational plate provides a protective guard to prevent oil from splattering upwards off a roller. The scraper may slope outward from the head foundational plate at an angle to facilitate scraping debris from grill grates. The oiling aperture may extend to a substantial portion of the length of the head foundational plate. The oiling aperture may be beveled or contoured such that when a user applies seasoning oil to the top of the aperture, the oil may be funneled into a narrower channel by gravity and then dripped onto a roller. The roller mount typically includes two tabs that extend beneath the head foundational plate at the two ends of the length of the head foundational plate. A roller mount includes a protrusion or hole by which to secure a roller at an end of the roller's length, such as at the center of the roller's end.

The roller includes an absorbent material covering the length of the roller and end caps positioned on the roller's ends. The absorbent material is preferably heat and fire resistant, such that it may be used on a grill for cleaning and/or oiling a grill without igniting or catching fire from the heat of the grill and grill flare-ups. The absorbent material may be fashioned from synthetic or natural fabric fibers, such as hemp, cotton, and other natural fibers. The absorbent material may substantially form the structure and thickness of the roller cylinder. The absorbent material may be rolled about a tube with open ends such that the tube operates as the skeletal or base structure by which the absorbent material is bonded. The tube may be fashioned from any of a number of rigid materials, such as wood, metal, composites, and the like. Preferably, the tube is formed from natural rigid materials, such as paper, cardboard or wood. Similarly, the end caps positioned on the roller's ends may be fashioned from rigid materials such as wood, metal, composites, and so on. Preferably, the end caps are formed from natural rigid materials, such as wood. The end caps, similar to the tube, may have open circular gaps in their centers such that an axle may be positioned through the end caps or tube so that the roller may be rotatably mounted to the roller mount.

By having the absorbent material, tube, and end caps fashioned from natural materials, the entire roller assembly may be used as a fire starter in the grill following use of the roller assembly to clean and season grill grates.

In an alternate embodiment, the roller is substituted for a rectangular pad that may be changeably mounted to the head. The rectangular pad may be positioned below the oiling aperture. Fastening means for the rectangular pad to the head may include adhesives, prongs, spring-assisted retaining levers, clamping means, and the like. Clamping means may be characterized by the rectangular pad being stretched over the top of the head and secured in place with compression clasps or similar tightening means.

The presently described grill cleaner and oiler may be used in any grilling scenario. Accordingly, the grill cleaner and oiler may be used for residential/home grill cleaning and oiling, and also has commercial applications, such as in restaurants, large outdoor commercial grills, and so forth. Given the utility of the device for different grill seasoning and applications, the length of the handle of the grill cleaning and oiling device can vary to ensure it can be readily applied to grills of different widths/depths. Likewise, the width of the roller or rectangular pad can vary per type of application or intended use.

Figure 2:
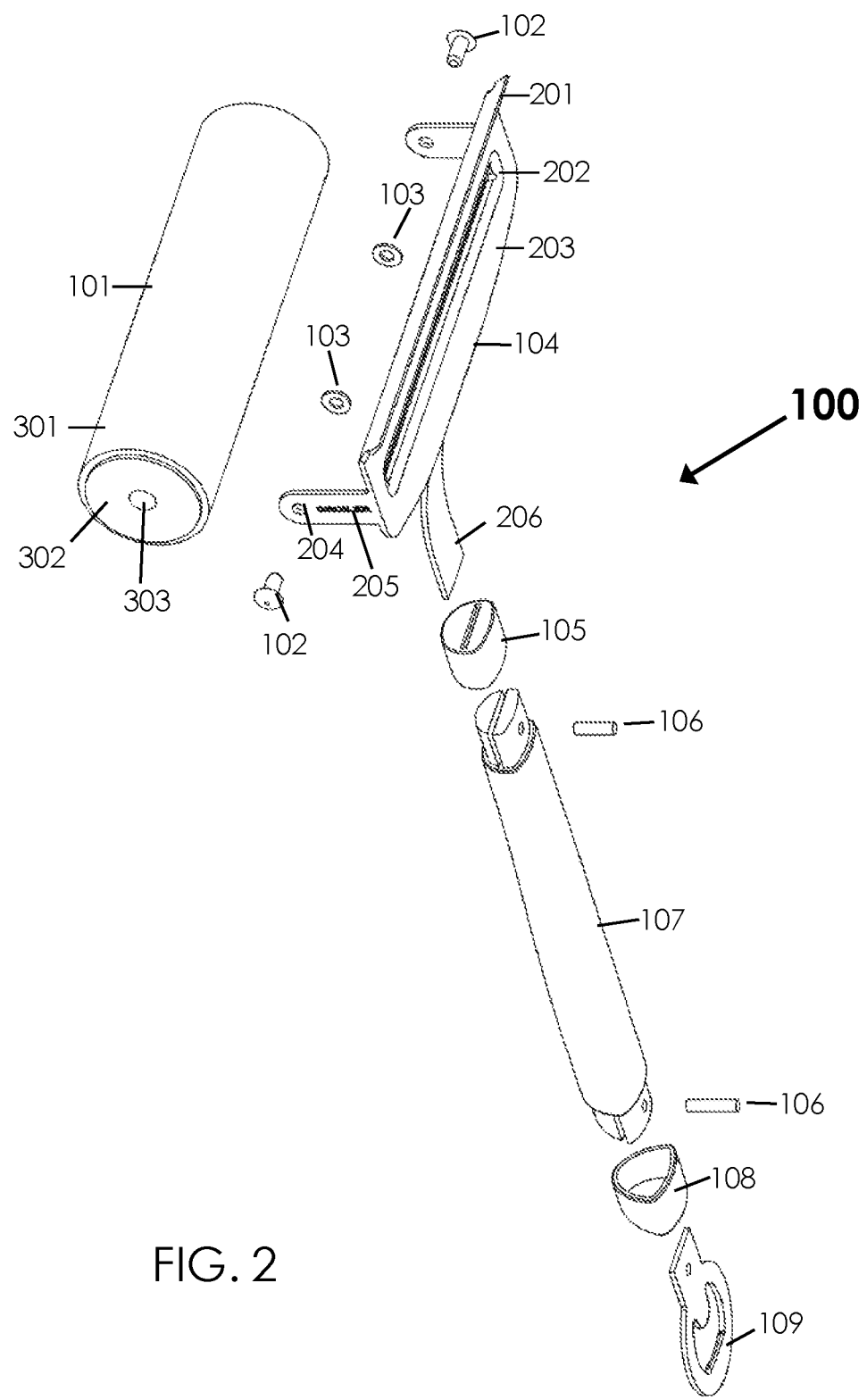
FIG. 2 is an exploded perspective view of an embodiment of the grill cleaner and oiler with a roller.
Figure 3:
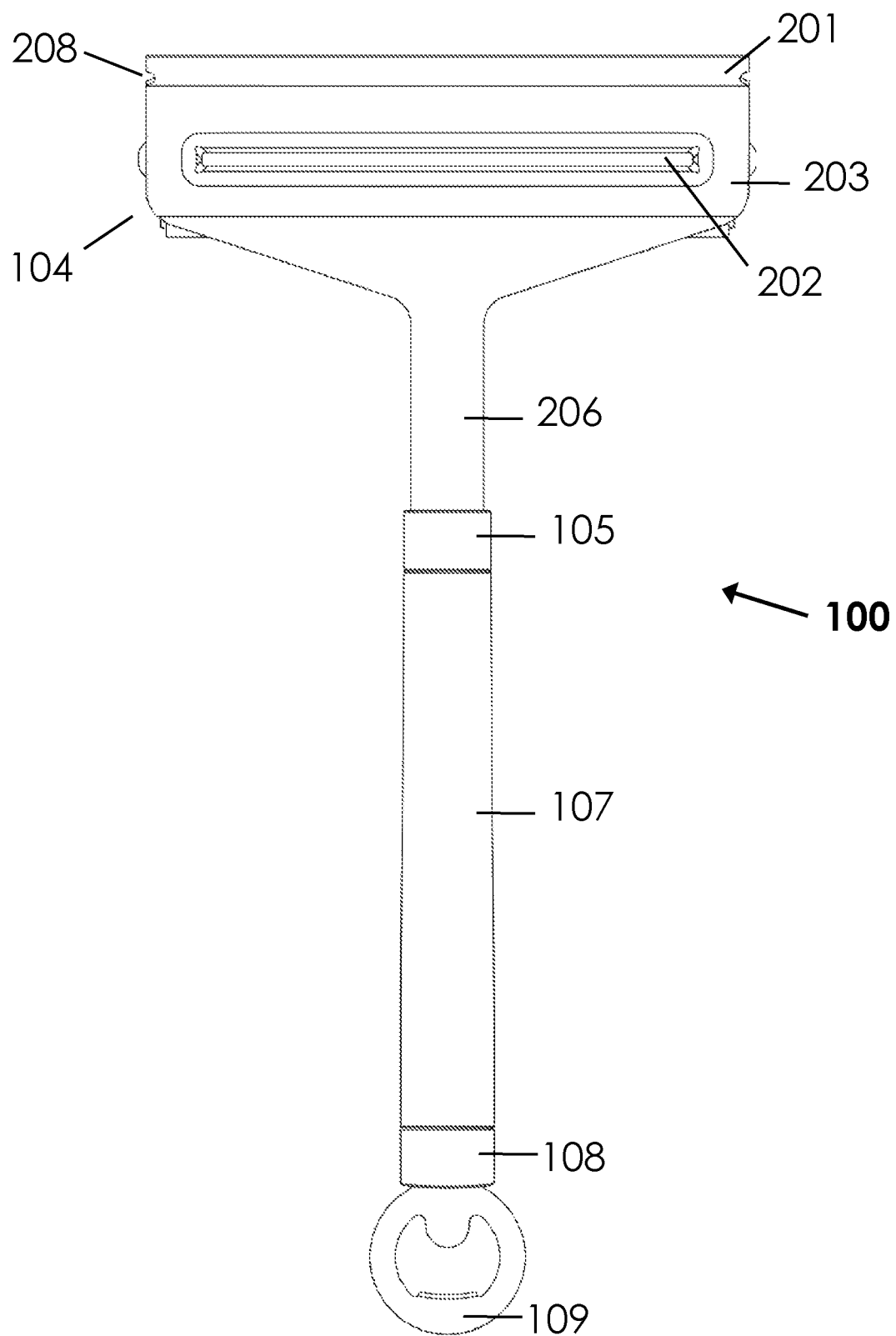
FIG. 3 is a top view of an embodiment of the grill cleaner and oiler with a roller.

Referring now to FIGS. 1, 2, and 3, a preferred embodiment of the presently disclosed grill cleaner and oiling device is respectively shown in a perspective, an exploded perspective, and overhead view. The preferred embodiment of an improved grill cleaner and oiler 100 includes a handle 107 that forms a support structure for which additional elements of the invention may be attached. A bottle opener and loop 109 is integrated into the rear of the handle 107, such as by finger joints. A pin 106 may be used to secure the bottle opener and loop 109 to the handle 107. The pin 106 may also be characterized by a rivet, screw, or like fastener. A decorative collar 108 slides over the finger joint of the handle 107 and bottle opener and loop 109 to obscure and protect the pin 106 from view.

A head 104 is integrated into the front of the handle 107, such as by finger joints facilitated by a tang 206 of the head 104. The tang 206 additionally provides length from the head to the handle. A pin 106 may be used to secure the head 104 to the handle 107. A decorative collar 105 slides over the finger joint of the handle 107 and the head 104 to obscure and protect the pin 106.

The head 104 is ideally fashioned from a single piece of a rigid material, such as metal, that may be cast or stamped and bent or machined to form the various refined elements of the head. The head 104 includes a substantially flat foundational plate 203. A forward edge of the plate 203 extends out and slopes outward at a straight or curved angle to form a scraper 201. The scraper 201 ideally has an edge honed to a tip, such as a bladed edge. The scraper 201 further has a cut-out 208 (as shown in FIG. 3) that is preferably circular shaped at each outside end or edge of the scraper. These cut-outs 208 allow for scraping of individual grates on a grill, and will typically provide for scraping the top and/or side portions of a grate.

The plate 203 has an aperture or channel 202 substantially throughout its length. The border between the aperture 202 and the plate 203 may be beveled or contoured to function as a funnel by which a user may apply seasoning oil to the aperture. The aperture 202 is preferably positioned above a surface on a grill cleaning device such that grill seasoning oil can be dispensed through the aperture 202 via gravity and onto the surface by a user. In a preferred embodiment, the surface that receives the oil is a roller 101.

In the preferred embodiment shown in FIGS. 1 and 2, at least two tabs 205 orthogonally extend below the foundational plate as a mount to hold a roller 101 in place. These tabs 205 include a hole 204 by which to mount a roller 101. The roller 101 can be held in place by a fastener 102, such as a screw, bolt, pin and so forth that slides through the hole 204 and inserts into the roller 101. The roller 101 is configured to roll across a grill grate when a user applies the device 100 to a grill grate.

The roller 101 is substantially cylindrical in shape and includes an absorbent material 301 along the periphery of the curved edge of the cylinder. The absorbent material may compose the entire thickness of the roller 101, either as a single, continuous material or layers of material that are wrapped over each other. Likewise, the absorbent material may be wrapped around a central tube or core in layers until a desired thickness is achieved or be applied as a single, continuous layer around a central tube or core. End caps 302 are applied to the substantially flat ends of the roller. The end caps 302 include a hole or gap 303 in their center. The roller 101 is rotatably mounted to the head 104 by rivets or screws 102 or similar fasteners, which are additionally secured in place by caps or bolts 103. In an alternate embodiment, the roller 101 may be rotatably mounted to the head 104 by flexible prongs that clamp onto or into the tube hole 303. In another embodiment, a spring-like insert or long bar with a bent end may extend along the length of the roller 101 and protrude from the hole 303 to rotatably mount to the head 104 through the mounting hole 204.

Figures 4, 5:
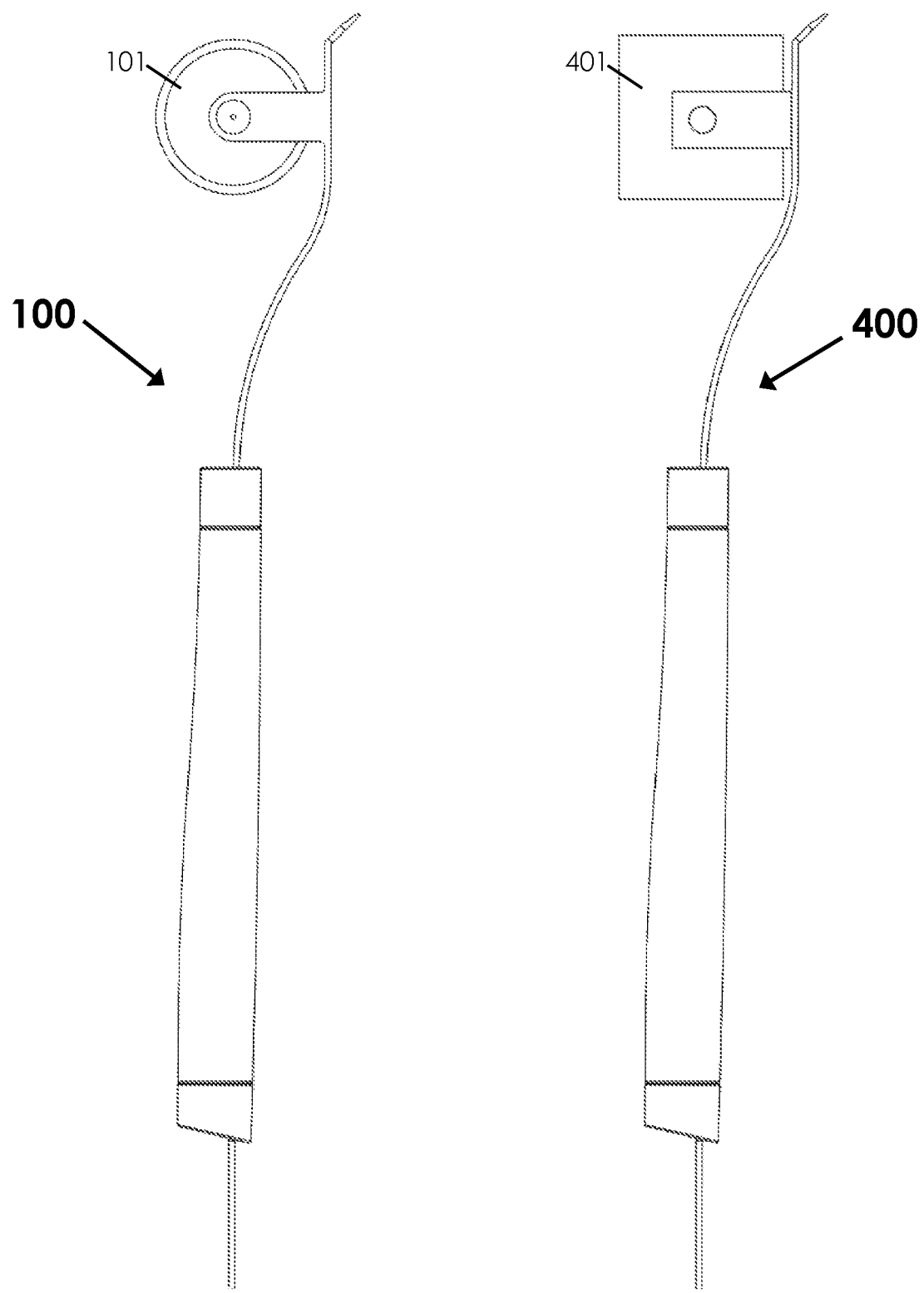
FIG. 4 is a side view of an embodiment of the grill cleaner and oiler with a roller.
FIG. 5 is a top view of an embodiment of the improved grill cleaner and oiler with a rectangular pad.

FIG. 4 shows a side view of the preferred embodiment of the grill grate cleaner and oiler 100 having a roller 101 absorbent pad. FIG. 5 shows a side view of an alternatively preferred embodiment of a grill grate cleaner and oiler 400 having a rectangular pad 401 absorbent pad. Other than the change in type of absorbent material structure, the embodiment 400 having the rectangular pad 401 is essentially the same as the embodiment 100 having the roller 101 absorbent material structure.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A grill grate cleaning and oiling apparatus comprising:
    a handle;
    a head joined to a first proximal end of the handle, the head having a foundational plate,
        wherein the foundational plate has a scraper and an aperture; and
    a roller having a horizontal center and freely rotatably joined to the head, the roller having an absorbent material around an exterior rolling surface of the roller,
        wherein the absorbent material is fire resistant to grill heat and flames, and
        the aperture is an elongated narrow opening having a length that extends across the foundational plate and positioned above the horizontal center of the roller.

2. The grill grate cleaning and oiling apparatus of claim 1, the handle having the first proximal end and a second distal end; and
    the apparatus further comprising a loop joined to the second distal end of the handle.

3. The grill grate cleaning and oiling apparatus of claim 1, the handle having the first proximal end and a second distal end; and
    the apparatus further comprising a bottle opener joined to the second distal end of the handle.

4. The grill grate cleaning and oiling apparatus of claim 1, the apparatus further comprising a tang between the first end of the handle and the head;
    the tang extending from the first proximal end of the handle and joining the head,
        whereby the tang connects the head to the handle.

5. The grill grate cleaning and oiling apparatus of claim 1, the head further comprising a first tab at a first end of the head and a second tab at a second opposite end of the head, wherein each tab orthogonally extends below the foundational plate to form a mount, wherein the mount is positioned to hold the roller in place and allow the roller to rotate.

6. The grill grate cleaning and oiling apparatus of claim 5, wherein the roller is rotatably attached to the tabs of the head, wherein each of the tabs has a hole through which a fastener slides through and holds the roller in place by inserting into the roller.

7. The grill grate cleaning and oiling apparatus of claim 6, wherein the roller is removably attached to the tabs of the head.

8. The grill grate cleaning and oiling apparatus of claim 1, the roller having a first end and a second opposite end, wherein each of the first and second ends is covered with an end cap.

9. The grill grate cleaning and oiling apparatus of claim 1, the absorbent material being made of material selected from the group consisting of synthetic fibers, hemp, burlap, cotton, other natural fibers, and a combination thereof.

10. The grill grate cleaning and oiling apparatus of claim 1, the roller having an inner core covered by the absorbent material.

11. The grill grate cleaning and oiling apparatus of claim 1, wherein the roller is formed of the absorbent material.

12. The grill grate cleaning and oiling apparatus of claim 1, wherein the head has a first end having a first outside edge and a second opposite end having a second outside edge, wherein the first outside edge has a first cut-out and the second outside edge has a second cut-out.

13. The grill grate cleaning and oiling apparatus of claim 12, wherein each of the first and second cut-outs are circular shaped.

14. The grill grate cleaning and oiling apparatus of claim 1, wherein the aperture is positioned through the foundational plate and has a channel configuration that is contoured from a wider opening on an upper surface of the head to a narrower opening on a lower surface of the head, the aperture configured to funnel oil placed into the aperture on the top surface of the head and drop the oil from the lower surface of the head onto the roller via gravity.

15. The grill grate cleaning and oiling apparatus of claim 14, wherein the length of the aperture is approximately equal to the length of the roller.

16. A grill grate cleaning and oiling apparatus comprising:
a handle;
a head joined to a first proximal end of the handle, the head having a scraper and a foundational plate, wherein the foundational plate has an aperture; and
an absorbent material attached to the head, wherein the absorbent material is fire resistant to grill heat and flames,
wherein the absorbent material is removably attached to the head as a rectangular pad, wherein the rectangular pad has an upper surface that faces the foundational plate and a lower surface that faces away from the foundational plate, and
the aperture is positioned through the foundational plate and has a channel configuration that is contoured from a wider opening on an upper surface of the head to a narrower opening on a lower surface of the head, the aperture configured to funnel oil placed into the aperture and drop the oil from the lower surface of the head onto the rectangular pad via gravity.

17. The grill grate cleaning and oiling apparatus of claim 16, the absorbent material being made of material selected from the group consisting of synthetic fibers, hemp, burlap, cotton, other natural fibers, and a combination thereof.

* * * * *